June 22, 1937.  L. MOLLET  2,084,698
CONNECTING DEVICE
Filed Dec. 9, 1935  2 Sheets-Sheet 1

L. Mollet
INVENTOR

By: Glascock Downing & Seebold
Attys.

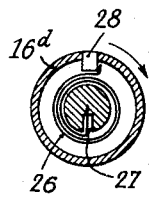
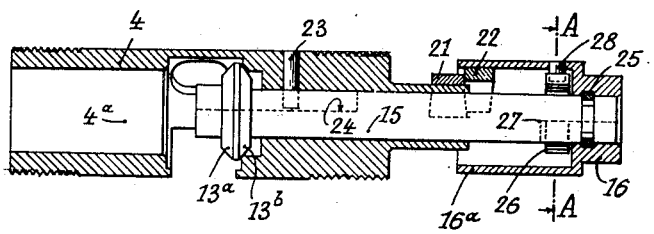
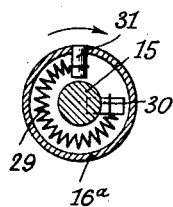
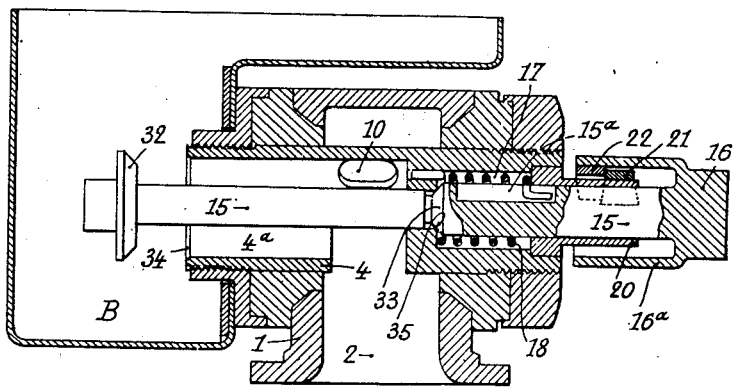
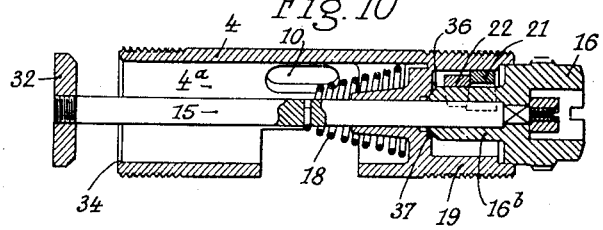

Patented June 22, 1937

2,084,698

UNITED STATES PATENT OFFICE 2,084,698

CONNECTING DEVICE

Léon Mollet, Asnieres, France, assignor to Société Anonyme Des Usines Chausson, Asnieres, France Application December 9, 1935, Serial No. 53,684
In Germany December 13, 1934

5 Claims. (Cl. 251—137)

The present invention relates to connecting devices permitting to establish or to interrupt, at will, and without any dismounting, the communication between two chambers or conduits used for a liquid or gaseous fluid, for example between a water chamber and a unit of radiator, or a steam drum and a unit of radiator, which may be aerothermic, or the like.

The said device is chiefly characterized by the fact that it comprises, in combination, a tubular member opening at one end into one of the chambers and comprising lateral orifices for communication with the second chamber; a double valve provided with a stem located on the axis of said member and projecting to the exterior, which in one position closes an orifice of communication between the two chambers, and in the other, opens the said orifice and closes the passage around the said stem, thus preventing all communication between the two chambers and the atmosphere; a fixed ramp or projection secured to the tubular member and a movable ramp participating in the longitudinal movements of the device consisting of the double valve, these two ramps being so shaped as to provide for an axial displacement of one of the ramps when it rotates in contact with the other, and the movable ramp may be brought by a rotation and by a longitudinal displacement either to the front or rear, in the direction of the axis of the fixed ramp, and symmetrically with reference to the latter, in correspondence with the application of the valve upon one or the other of its seatings; and a spring so arranged as to turn the movable ramp in contact with the fixed ramp when its displacement is terminated, in such manner as to cause an axial displacement which determines the production, between the valve and the seating, of a pressure which assures a non-leaking operation.

The accompanying drawings show by way of example various embodiments of the connecting device according to the invention which are employed in order to place a radiator unit in circuit or out of circuit.

In the said drawings:

Figs. 5 and 6 show, in like manner, a second and a third modification.

Fig. 7 is a cross-section on the line A—A of Fig. 6.

Fig. 8 is a like view of a modification, with a coiled spring.

Fig. 9 is a longitudinal section of another modification, the valve being in the open position.

Fig. 10 represents a construction with a spring of non-rusting metal placed in the circuit.

Figure 1:
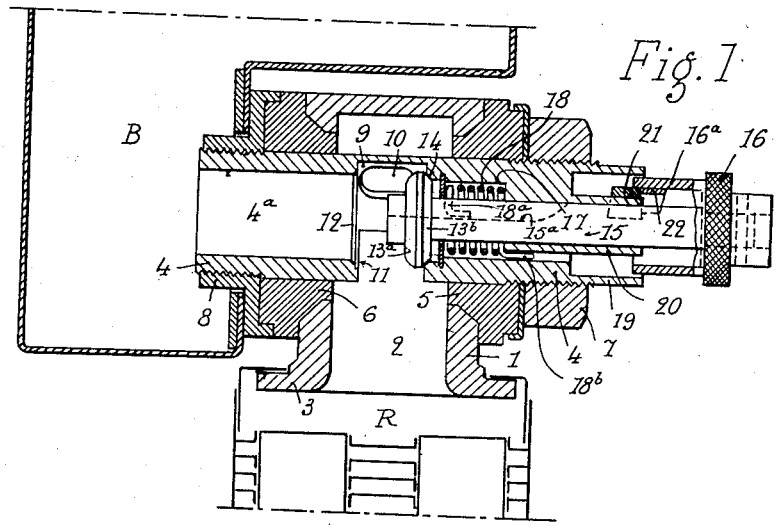
Fig. 1 is a longitudinal section of a first embodiment, the valve being in the open position in which the two chambers communicate.

In the example of execution represented in Fig. 1, the device comprises a main frame 1 having an internal chamber 2 and a flange 3 for connection with the radiator part R. In the said frame, and perpendicular to the chamber 2, is mounted a tubular member 4, non-leaking conditions being assured by two packing pieces 5 and 6 which are held in place respectively by a nut 7 and a screwed member 8.

The bore 4$^a$ of the tubular member 4 communicates at its left-hand end with an outer chamber, which is in this case the upper water recipient B, and the right-hand end communicates with a chamber 9 which—through the lateral orifice 10 and a cut-out part 11—communicates in turn with the chamber 2.

At the outlet of the bore 4$^a$ leading into the chamber 9, is provided a seating 12 for one face 13$^a$ of a valve means whose other face 13$^b$ cooperates with a seating 14 in order to prevent, between the chamber 9 and the atmosphere, all communication which might take place around the stem 15 of the double valve. This valve, in fact, extends from the exterior of the member 4, and at this point it is provided with a tubular operating head 16.

In the rear of the seating 14, and in the chamber 17, is mounted a spring 18, coaxial with the valve stem, whose curved end 18$^a$ is engaged in a longitudinal groove of some length 15$^a$ in the said stem, the other end 18$^b$ being fitted into the tubular member 4.

In the construction shown in Fig. 1, the member 4 is provided, on the right-hand or outer side, with two tubular members 19 and 20, which latter aids in the guiding of the rod 15. The tubular member 20 is provided at the exterior with a ramp 21 which constitutes the stationary ramp mentioned in the beginning of the present description. On the other hand, the tubular part 16$^a$ of the head 16—which is adapted to enter between the two tubular members 19 and 20—is also provided with a ramp 22, extending, like the ramp 21, upon a part of the circumference. These two ramps each have an axis of symmetry, and are in contact upon an oblique side, in front of the ramp 21, when the valve 13a is closed, and in the rear of said ramp when this valve is open and valve 13b closed, the spring 18 being stretched in either position.

Figure 3:
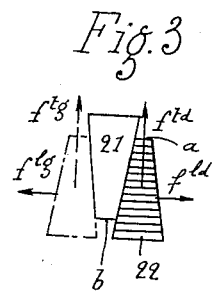
Fig. 3 is a diagrammatic plan view of the two ramps.

In the position represented in Figs. 1 and 3, the ramp 22 being in the rear of the ramp 21, the controlling head 16 projects almost entirely to the exterior, and thus the operator is aware, at a glance, that the radiator part R communicates with the water recipient B. As the spring 18 is now stretched, the ramp 22 will be urged in the direction of the arrow $f^{td}$ (Fig. 3) and hence the device 13a—13b—15—22 will be constantly urged in the direction of the arrow $f^{ld}$, and thus the valve 13b will be applied by pressure upon its seating 14, which makes a tight fit.

Figure 2:
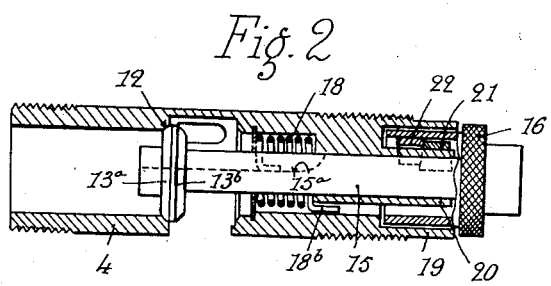
Fig. 2 represents, partially, the same valve in longitudinal section, in the second position of the valve.

In order to place the part R out of communication with the receptacle B, it is simply necessary to bring the ramp 22 to the other side, that is, in front of the ramp 21. For this purpose, the head 16 is turned from right to left, against the action of the spring 18, so that the ramp 22 will leave the ramp 21, and then the head is pushed to the left and is left free as soon as the face $a$ (Fig. 3) of the ramp 22 has been released from the face $b$ of the ramp 21. Under the antagonistic action of the spring 18, the device will turn automatically in the direction of the arrow $f^{tg}$ (Fig. 3), and the valve 13a, which has now come upon the seating 12 (Fig. 2), is applied upon the latter by pressure, by the effect of the reaction $f^{lg}$, of the ramp 21.

Figure 4:
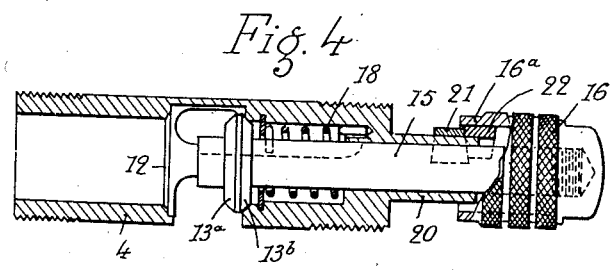
Fig. 4 represents, partially, a modification, in longitudinal section.
Figure 5:
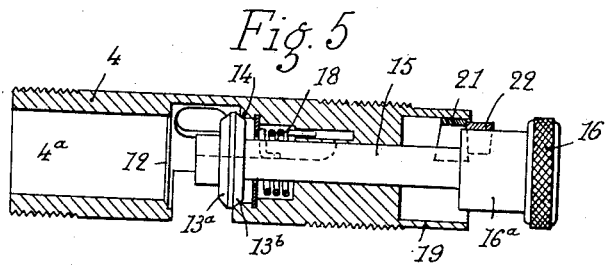

The modification represented in Fig. 4 differs from the preceding device simply by the elimination of the tubular member 19, so that the ramp 21 is apparently in the position in which the part R is supplied. The same members relate to the same parts as before, as well as for Fig. 5.

In this other modification, the tubular member 20 is eliminated; the ramp 21 is placed against the inner side of the tubular member 19, and the ramp 22 against the outer side of the tubular part 16a of the controlling head 16, so that the said ramp 22 will be visible in the position in which the part R is supplied.

In the modification represented in Figs. 6 and 7, only the controlling head 16 is subject to rotation. The stem 15 of the double valve 13a—13b is held against rotation by a stud 23 mounted on the tubular member 4 and engaged in a groove 24 in the said stem. It only participates in the longitudinal movements of this head 16, due to a segment 25. On the other hand, the spring in this case is a spiral spring 26 whereof one end is engaged in a notch 27 in the stem 15 and the other end is attached to a stud 28 mounted on the tubular part 16a of the controlling head.

Instead of the spiral spring 26, use can be made of a coiled spring 29 (Fig. 8) which operates by elongation, that is, it is mounted transversely and is attached to two studs 30 and 31 provided on the stem 15 and on the tubular part 16a of the head 16.

In the construction represented in Fig. 9, instead of employing a valve with double face, two single valves 32 and 33 are mounted on the same stem. The valve 32 on the end of the stem 15 is located in the interior of the recipient B, and its seating 34 is situated at the end of the tubular member 4, so that it will be closed by an outward movement of the controlling head 16. This arrangement has the advantage of reducing the general size, during the normal time at which all of the radiator units are supplied.

The valve 33 has its seating at 35 in the chamber 17 of the spring 18, at the outer end of the bore in which the stem 15 is slidable. The spring 18 is arranged in a manner similar to what is shown in Figs. 1 to 5.

The construction shown in Fig. 10 is of the same nature as the preceding, that is, it comprises two single valves 32 and 36. The valve 32 is arranged in the same manner as before, but the second valve 36 has now its seating 37 located at the exterior, that is, in the chamber formed by the tubular member 19. The said valve 36 is formed on the end of the appendage 16b of the head 16 used for the control of the valve stem.

On the other hand, the device comprises a spring 18 of rustless metal which may thus be placed in a fluid, as shown, and this simplifies the construction.

In the case of the embodiment shown in said Fig. 10, as in the case of that of Fig. 9, the least projection of the device 15—16 to the exterior indicates the opening of the valve 32.

It is obvious that the invention is not limited to the embodiments herein described and represented, and that it comprises all modifications depending upon the same principles.

Having now described my invention what I claim as new and desire to secure by Letters Patent is:

1. A connecting device between two chambers for establishing and interrupting, at will, a flow of fluid between said chambers, embodying a body provided with an inner bore, an orifice for the connection of said bore with one of said chambers, at least one orifice, spaced from the first orifice along said bore, for the connection of said bore with the other chamber, a stem slidably mounted in said body and extending beyond one end of the latter to the outside, a first valve means carried by said stem for closing said bore between said two orifices for one position of the stem, a second valve means for closing the passage around said stem for another position of the same, two valve seats provided within said body for said two valve means respectively, a stationary projection carried by said body and provided with two oppositely inclined faces, an actuating head secured to the outer end of said stem, a projection carried by said head and provided with two oppositely inclined faces adapted to contact the corresponding faces of said stationary projection in correspondence with the two positions of said stem and a spring one end of which is attached to said body and the other end is slidably mounted in a longitudinal slot of said stem for urging the latter in rotation.

2. A connecting device between two chambers for establishing and interrupting, at will, a flow of fluid between said chambers, embodying a body provided with an inner bore, an orifice for the connection of said bore with one of said chambers, at least one orifice, spaced from the first orifice along said bore, for the connection of said bore with the other chamber, a stem slidably mounted and held against rotation in said body and extending beyond one end of the latter to the outside, a first valve means carried by said stem for closing said bore between said two orifices for one position of the stem, a second valve means for closing the passage around said stem for another position of the same, two valve seats provided within said body for said two valve means respectively, a stationary projection carried by said body and provided with two oppositely inclined faces, an actuating head rotatably mounted on the outer end of said stem and held against longitudinal displacement along the same, a projection carried by said head and provided with two oppositely inclined faces adapted to contact the corresponding faces of said stationary projection in correspondence with the two positions of said stem and a spring connected with said head and said stem for urging the latter in rotation.

3. A connecting device between two chambers for establishing and interrupting, at will, a flow of fluid between said chambers, embodying a body provided with an inner bore, an orifice for the connection of said bore with one of said chambers, at least one orifice spaced from the first orifice along said bore for the connection of said bore with the other chamber, a stem slidably mounted in said body along the axis of said bore and extending beyond one end of said body to the outside, a first valve means carried by said stem for closing said bore in one position of the stem, a second valve means for closing the passage around said stem for another position of the same, two valve seats provided within said body for said two valve means respectively, means for moving said stem from one of said positions to the other, a stationary projection carried by said body and provided with two oppositely inclined faces, a projection adapted to rotate about said axis, longitudinally movable with said stem so that it may bear, at will, on either side of said stationary projection, and provided with two oppositely inclined faces adapted to contact the corresponding faces of said stationary projection in correspondence with the two positions of said stem, and spring means adapted to rotate said movable projection for urging either of said valve means against its own seat according to the position of said stem.

4. A device as claimed in claim 3 wherein said inner bore opens directly into the first chamber and said first valve is brought into its open position when moving towards said chamber, whereby the communication between the two chambers is established when said stem is in its inner position.

5. A device as claimed in claim 3 further comprising an actuating head mounted on the outer end of said stem, longitudinally movable with the latter and rotatable about said stem, said movable projection being carried by said head.

LÉON MOLLET.